United States Patent [19]

Miller et al.

[11] Patent Number: 5,431,941
[45] Date of Patent: Jul. 11, 1995

[54] METHOD OF REDUCING THE BUTTERFAT CONTENT OF A MILK PRODUCT

[75] Inventors: John D. Miller, Ithaca; Alan R. Rausch, Cortland; Kenneth M. Williamson, Jamesville; Peter J. Degen, Huntington, all of N.Y.

[73] Assignee: Pall Corporation, East Hills, N.Y.

[21] Appl. No.: 252,696

[22] Filed: Jun. 2, 1994

[51] Int. Cl.⁶ ................................. A23C 9/14
[52] U.S. Cl. .................... 426/422; 426/580; 426/804
[58] Field of Search ............... 426/804, 422, 423, 424, 426/425, 586, 580

[56] References Cited

U.S. PATENT DOCUMENTS

| | | |
|---|---|---|
| 2,872,043 | 2/1959 | Fitzgerald et al. |
| 2,929,503 | 3/1960 | Ambruster II et al. |
| 3,144,407 | 8/1964 | Olmos. |
| 3,268,442 | 8/1966 | Pall et al. |
| 3,829,592 | 8/1974 | Bratland .................... 426/580 |
| 4,238,521 | 12/1980 | Charm ....................... 426/580 |
| 4,292,180 | 9/1981 | Zylka ........................ 55/379 |
| 4,320,005 | 3/1982 | DeGraffenreid. |
| 4,340,479 | 7/1982 | Pall ........................... 210/490 |
| 4,372,847 | 2/1983 | Lewis. |
| 4,437,986 | 3/1984 | Hutchins et al. |
| 4,493,772 | 1/1985 | Tanaka. |
| 4,565,629 | 1/1986 | Wilson et al. |
| 4,588,500 | 5/1986 | Sprenger et al. |
| 4,663,222 | 5/1987 | Ohue et al. |
| 4,676,807 | 6/1987 | Miller et al. |
| 4,759,782 | 7/1988 | Miller et al. |
| 4,880,548 | 11/1989 | Pall ........................... 210/767 |
| 4,892,667 | 1/1990 | Parker III et al. |
| 4,933,197 | 6/1990 | Walker ....................... 426/425 |
| 5,024,762 | 6/1991 | Ford ........................ 210/321.69 |
| 5,028,436 | 7/1991 | Gauri ....................... 426/491 |
| 5,039,541 | 8/1991 | Keen ....................... 426/423 |
| 5,370,890 | 12/1994 | Sundfeld .................... 426/422 |

OTHER PUBLICATIONS

Abdel-Ghani et al., "Simulation of Non-Woven Fiber Mats and The Application to Coalescers", *Chemical Engineering Science*, 40(1), 117–129 (1985).

"Standard Methods for the Examination of Dairy Products," Marshall, ed., 16th Edition, 465–469 (1992).

*Primary Examiner*—Carolyn Paden
*Attorney, Agent, or Firm*—Leydig, Voit & Mayer, Ltd.

[57] ABSTRACT

The present invention provides a method of reducing the butterfat content of a liquid milk product comprising (a) providing a coalescing medium having a critical wetting surface tension of no more than about 50 dynes/cm, preferably a fibrous coalescing medium with an average fiber diameter of up to about 50 microns and a sheet weight of about 5 to about 30 oz/yd², (b) passing a liquid milk product containing butterfat through the coalescing medium at a flow rate of about 1 to about 20 gpm/ft² coalescing medium surface area to form coalesced butterfat particles and reduced-butterfat content liquid milk product, and (c) separating the coalesced butterfat particles from the reduced-butterfat content liquid milk product.

25 Claims, 2 Drawing Sheets

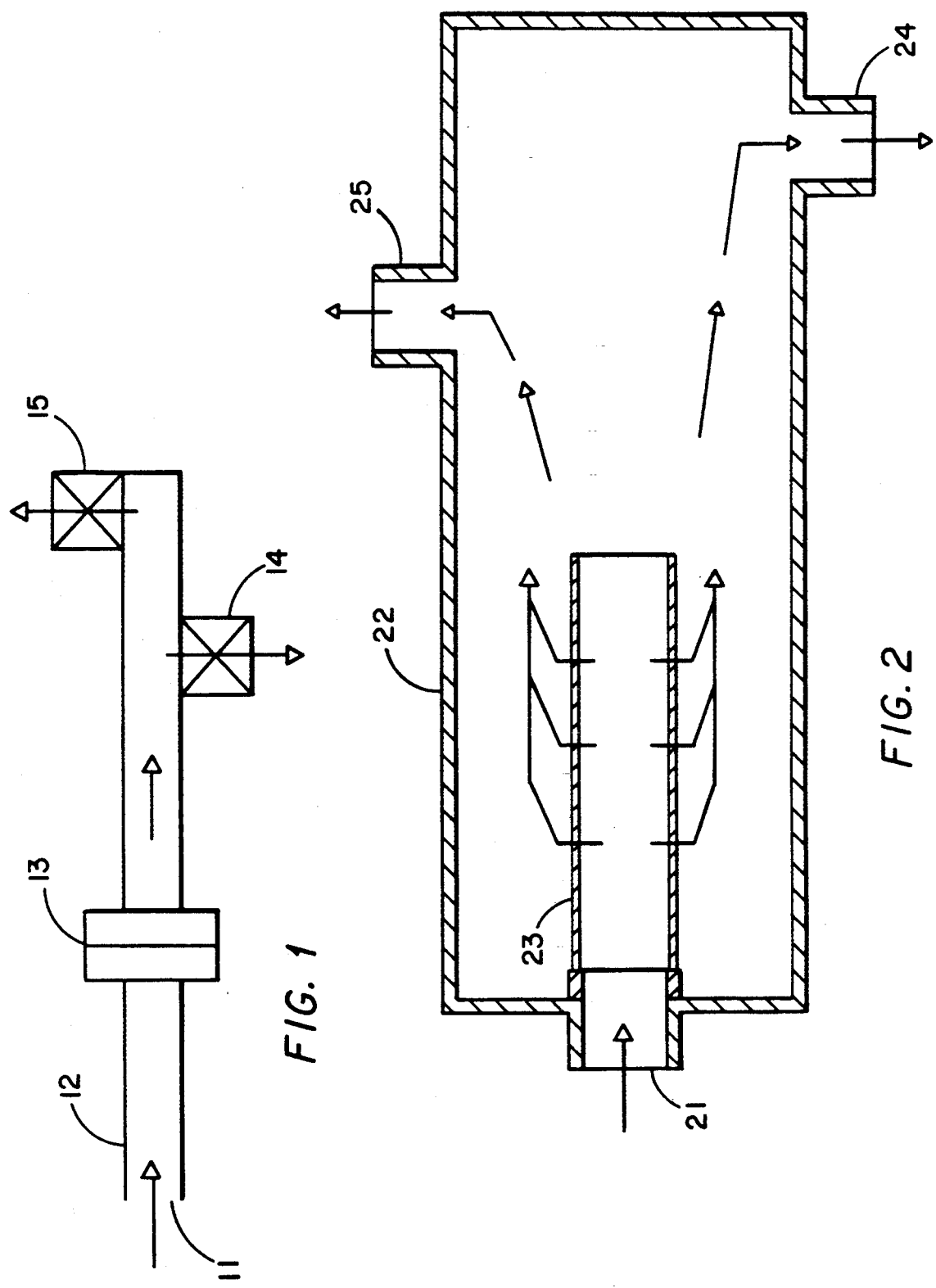

METHOD OF REDUCING THE BUTTERFAT CONTENT OF A MILK PRODUCT

TECHNICAL FIELD OF THE INVENTION

The present invention relates to the reduction of the butterfat content of milk, milk products, and dairy processing cleaning solutions.

BACKGROUND OF THE INVENTION

There are many techniques by which a liquid which is dispersed and insoluble (i.e., the dispersed liquid) within another liquid (i.e., the continuous phase liquid) can be separated from one another. While the separation of two liquids can be effected by taking advantage of the differences in buoyancy or specific gravity of the two liquids, many such liquid dispersions are so stable that such a buoyancy separation cannot be efficiently carried out in a reasonable period of time.

One technique which can be used in conjunction with other techniques such as buoyancy separation to efficiently separate such liquids within a reasonable time is known as coalescence. The technique of coalescence involves contacting a porous medium with the two liquids under certain conditions such that both liquids pass through the porous medium but such that the particles of the dispersed liquid are combined to form larger particles, i.e., the dispersed liquid coalesces. After passage through the porous medium, other techniques, such as separation effected by buoyancy in view of the difference in specific gravities of the two liquids, can be efficiently used to complete the separation of the two liquids in a reasonable time.

Milk is a fine dispersion of water-insoluble butterfat in a continuous aqueous phase of the milk. For many purposes, it is desirable to remove as much of the butterfat from the milk as possible, and the milk processing industry currently uses a mechanical apparatus, e.g., a cream separator, to separate the heavy cream, which includes butterfat, from whole milk. This process produces skim milk which generally contains an average of about 0.06 wt. % butterfat. The cream separator, however, is not particularly well-suited to efficiently reduce the butterfat content of milk to even lower levels.

Thus, there is a need for an efficient process to reduce the butterfat content of milk, particularly skim milk and buttermilk, and milk products such as whey. The present invention provides such a method of reducing the butterfat content of milk products through the use of coalescence technology. Surprisingly, despite the fine dispersion of butterfat within milk, particularly within skim milk and homogenized milk, it has been found that, under certain conditions, coalescing technology can be quite useful in effecting the separation of butterfat from milk. Moreover, the present inventive method is capable of doing so at reasonable flow rates and applied pressures. These and other objects and advantages of the present invention, as well as additional inventive features, will be apparent from the description of the invention provided herein.

BRIEF SUMMARY OF THE INVENTION

The present invention provides a method of reducing the butterfat content of a liquid milk product comprising (a) providing a coalescing medium having a critical wetting surface tension of no more than about 50 dynes/cm, preferably a fibrous coalescing medium with an average fiber diameter of up to about 50 microns and a sheet weight of about 5 to about 30 oz/yd$^2$, (b) passing a liquid milk product containing butterfat through the coalescing medium at a flow rate of about 1 to about 20 gpm/ft$^2$ coalescing medium surface area to form coalesced butterfat particles and reduced-butterfat content liquid milk product, and (c) separating the coalesced butterfat particles from the reduced-butterfat content liquid milk product.

BRIEF DESCRIPTION OF THE DRAWINGS

FIG. 1 is a schematic depiction of a coalescing apparatus for use in the context of the present invention.

FIG. 2 is a schematic depiction of an alternative coalescing apparatus for use in the context of the present invention.

DESCRIPTION OF THE PREFERRED EMBODIMENTS

Figure 3:
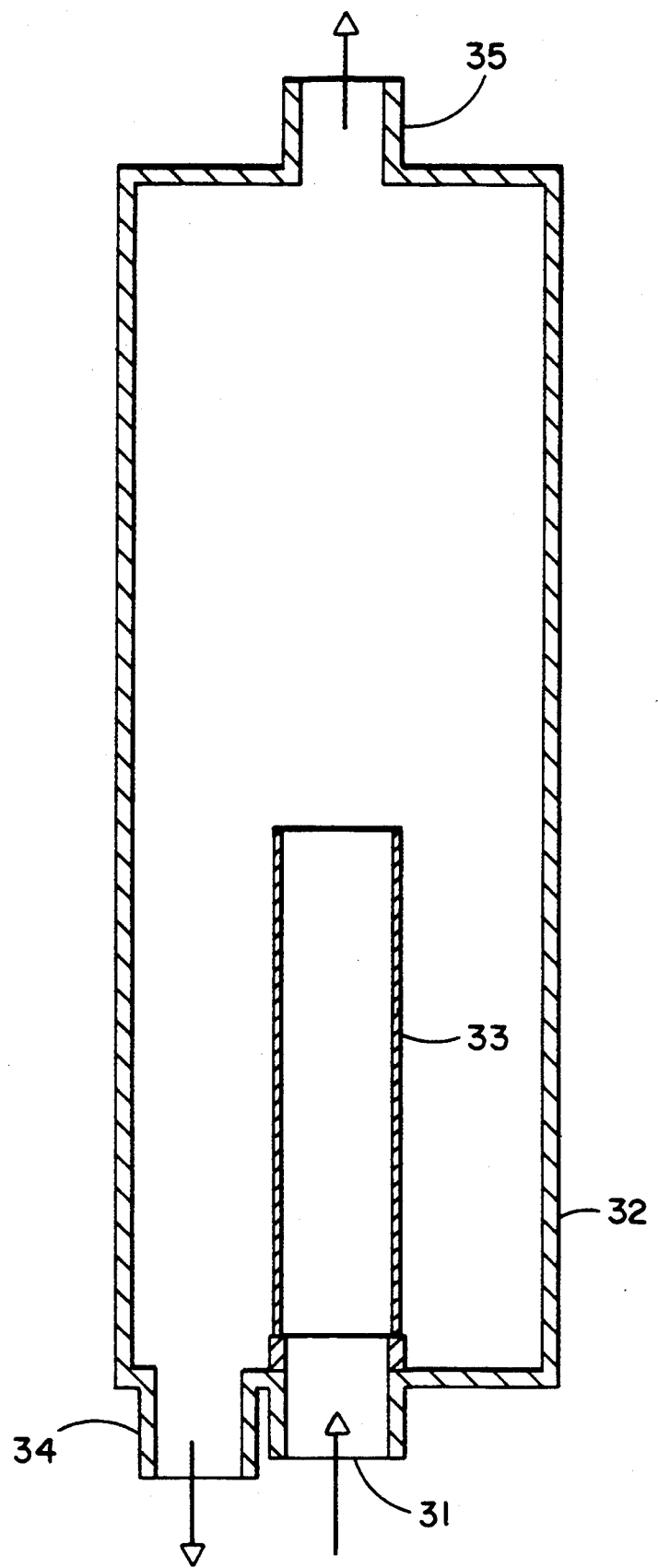
FIG. 3 is a schematic depiction of a preferred coalescing apparatus for use in the context of the present invention.

The present inventive method of reducing the butterfat content of a liquid milk product comprises (a) providing a coalescing medium having a critical wetting surface tension of no more than about 50 dynes/cm, (b) passing a liquid milk product containing butterfat through the coalescing medium at a flow rate of about 1 to about 20 gpm/ft$^2$ coalescing medium surface area to form coalesced butterfat particles and reduced-butterfat content liquid milk product, and (c) separating the coalesced butterfat particles from the reduced-butterfat content liquid milk product.

Any suitable liquid milk product may be utilized in the context of the present inventive method. Such liquid milk products include (a) milk, such as whole milk, skim milk, and buttermilk, (b) milk products, such as whey, and (c) dairy processing cleaning solutions which can accumulate butterfat during use, such as dilute caustic solutions (e.g., aqueous solutions of sodium hydroxide and potassium hydroxide). The present inventive method is particularly useful in the treatment of liquid milk products which have a butterfat content of less than about 4 wt. %, preferably less than about 1 wt. %, more preferably less than about 0.5 wt. %, and most preferably less than about 0.1 wt. %. The present inventive method is particularly well-suited for use in further reducing the butterfat content of skim milk, which generally has a butterfat content of about 0.06 wt. % or less.

The present inventive method is capable of significantly reducing the butterfat content of a liquid milk product, including to levels below those possible with current commercially used mechanical separating means. Depending on the initial butterfat content of the milk product, the present invention is capable of reducing the butterfat content of that milk product to below 0.03 wt. %, and even to as low as 0.005 wt. % and below. Of course, a milk product may be passed through a number of coalescing media, of the same or different types, or repeatedly passed through the same coalescing medium, to effect the desired reduction in butterfat content. All of the butterfat content values set forth herein to describe and illustrate the present invention reflect values determined by using the Gerber method set out in "Standard Methods for the Examination of Dairy Products" (Marshall, ed., 16th Edition, 1992), pp. 465–469.

The coalescing medium may be of any suitable construction and material, e.g., a fibrous mass or a sheet material which can be used as is or in corrugated or pleated form. The coalescing medium is desirably a fibrous mass or web, preferably in uncorrugated sheet form for ease of cleaning. Coalescing apparati and elements incorporated therein are generally well-known and are disclosed in, for example, U.S. Pat. No. 4,759,782, as well as in U.S. patent application Ser. No. 08/038,231 (filed Mar. 29, 1993), which is a continuation-in-part of U.S. patent application Ser. No. 07/996,128 (filed Dec. 23, 1992), and U.S. patent application Ser. No. 08/207,077 (filed Mar. 8, 1994). While coalescing media have been used most often to remove or separate small amounts of moisture from petroleum based fuels and cleaning fluids and to separate oil from water, coolants, and cleaners, it has been surprisingly discovered that such coalescers can be efficiently utilized to separate butterfat from liquid milk products.

The coalescing medium acts to coalesce the butterfat within the milk product being treated upon the milk product contacting and passing through the coalescing medium. The coalesced butterfat, i.e., larger particles or agglomerates of butterfat, have a lower density than the reduced-butterfat content milk product and, as a result of their increased particle size, rise to the top of the reduced-butterfat content milk product. Thus, after the milk product has contacted and passed through the coalescing medium, the reduced-butterfat milk product can be recovered by drawing off the milk product from the bottom of the containment means in which the treated milk product has been passed after contact with the coalescing medium and/or recovering the coalesced butterfat from the top of that same containment means.

To assist in the separation and recovery of the reduced-butterfat content milk product from the coalesced butterfat, the milk product is preferably passed after contact with the coalescing medium to a reservoir or other containment means wherein buoyancy can be most effectively utilized to effect the separation of the coalesced butterfat from the reduced-butterfat content milk product. Other means, such as suitable separator media, can be also utilized to enhance the separation of the reduced-butterfat content milk product from the coalesced butterfat.

Suitable coalescing apparati for use in the context of the present invention are depicted in FIGS. 1-3. In FIG. 1, the milk product to be treated is passed into the inlet 11 of piping means 12 and through a coalescing medium 13. The reduced butterfat-content milk product can be recovered downstream through outlet 14, while the coalesced butterfat can be removed downstream through outlet 15. In FIG. 2, which is an alternative coalescing apparatus for use in connection with the present invention, the milk product to be treated is passed into the inlet 21 of housing 22 and then into the interior of a cylindrical or tubular dead-end coalescing medium 23 contained within the housing 22. The reduced butterfat-content milk product can be recovered downstream through outlet 24, while the coalesced butterfat can be removed downstream through outlet 25. Similarly, in FIG. 3, which is a more preferred coalescing apparatus for use in connection with the present invention, the milk product to be treated is passed into the inlet 31 of housing 32 in a vertical direction and then into the interior of a cylindrical or tubular dead-end coalescing medium 33 contained within the housing 32. The reduced butterfat-content milk product can be recovered downstream through outlet 34, which is positioned below the coalescing medium 33, while the coalesced butterfat can be removed downstream through outlet 35, which is positioned vertically above the coalescing medium 33.

The coalescing medium may be any suitable material. The coalescing medium will generally be hydrophobic and/or oleophilic, i.e., having a critical wetting surface tension (CWST) of less than about 72 dynes/cm, rather than hydrophilic such as a glass fibrous medium which has a CWST of about 75 dynes/cm. The coalescing medium will desirably have a CWST of no more than about 50 dynes/cm, preferably about 40 dynes/cm or less, and most preferably about 20 to about 40 dynes/cm. Preferably, the coalescing medium is a fibrous nonwoven web, particularly a fibrous nonwoven web comprising a fluorocarbon, aramid, or polyolefin polymer. Suitable fluorocarbon polymers include a copolymer of ethylene and chlorotrifluoroethylene (ECTFE) which has a CWST of about 28 dynes/cm, polytetrafluoroethylene (PTFE) which has a CWST of about 25 dynes/cm, and polyvinylidene difluoride (PVDF) which has a CWST of about 30 dynes/cm. Suitable aramid polymers include poly(paraphenyleneterephthalamide), which has a CWST of about 40 dynes/cm, and related compounds wherein the majority of the amide groups are directly attached to two aromatic rings. Suitable polyolefins include polypropylene which has a CWST of about 32 dynes/cm. Other suitable polymers include polyester which has a CWST of about 45 dynes/cm, as well as combinations of the aforementioned polymers as separate layers within the coalescing medium or intermingled as a single layer of the coalescing medium. The CWST of a porous medium can be determined using the procedure disclosed in U.S. Pat. No. 4,880,548.

The coalescing medium can have any suitable porosity, air flow resistance, sheet weight, and other physical properties, so long as the coalescing medium effects the coalescing of the butterfat in the milk product. Ideally, the coalescing agent will effect the desired separation of butterfat from the milk product at reasonable flow rates and applied pressures.

The coalescing medium preferably has an air flow resistance of no more than about 5 in. water column, most preferably an air flow resistance of no more than about 2 in. water column. All of the air flow resistance (i.e., pressure drop or $\Delta P$) values set forth herein to describe and illustrate the present invention reflect values determined using an air flow rate of 28 ft/min in accordance with the general procedure described in U.S. Pat. No. 4,340,479.

The coalescing medium is preferably a fibrous medium, particularly a fibrous nonwoven web. As such, the coalescing medium preferably has an average fiber diameter of up to about 50 microns, more preferably about 2 to about 20 microns. The coalescing medium further preferably has a sheet weight of about 5 to about 30 oz/yd$^2$, more preferably a sheet weight of about 10 to about 20 oz/yd$^2$, and most preferably a sheet weight of about 10 to about 15 oz/yd$^2$. The desirable sheet weight of the coalescing medium will vary somewhat depending on the particular application. Generally, the coalescing medium will have as low a sheet weight as possible as consistent with reproducible effective results. A lower sheet weight will typically result in a lower flow resistance and a thinner sheet, which in turn reduces material costs and enables the easier manipulation of the sheet, particularly the easier handling or corrugation of the sheet without damage for use in a cylindrical or tubular configuration.

A liquid milk product to be treated in accordance with the present invention can be passed through the coalescing medium at any suitable flow rate sufficient to effect the coalescing of the butterfat within the milk product. In general, the flow rate of the milk product should be about 1 to about 20 gpm/ft$^2$ coalescing medium surface area, i.e., about 1 to about 20 gallons of milk product per minute per square foot of the surface area of the coalescing medium through which the milk product is being passed. The milk product flow rate will be preferably about 1 to about 10 gpm/ft$^2$ coalescing medium surface area, most preferably about 1 to about 5 gpm/ft$^2$ coalescing medium surface area.

A milk product treated in accordance with the present invention can be contacted with one or more coalescing media, in one or more passes, in either a continuous or batch process. Suitable coalescing apparati useful in the context of the present invention can therefore include one or more coalescing media of the same or different constructions and configurations.

The present inventive method can be used to treat a liquid milk products which has already been subjected to a conventional mechanical cream separation process in the dairy industry. Alternatively, a liquid milk product can be treated in accordance with the present invention more than once, e.g., by passing the liquid milk product through multiple coalescing media in series until the desired reduced butterfat level is achieved in the liquid milk product. Such a serial mode of operation may be especially advantageous where large reductions in butterfat content are required in a single processing step (i.e., one pass). Similarly, the butterfat content of a liquid milk product can be passed through a coalescing medium more than once until the desired reduced butterfat level is achieved in the liquid milk product.

While the present inventive method can be used on whole milk and other relatively high butterfat-content liquid milk products, the high butterfat content of such liquid milk products can result in a high pressure drop across the coalescing medium being reached quite rapidly, such that the present inventive method preferably utilizes a coalescing medium of increased surface area, for example, in series and/or in parallel, for such high butterfat-content liquid milk product as compared to a coalescing medium which could be efficiently utilized for lower butterfat-content liquid milk products.

The liquid milk product to be treated in accordance with the present invention can contact the coalescing medium at any suitable temperature, e.g., room temperature of about 20°–25° C., although temperatures as low as about 10° C. and as high as about 50°–70°, which is the range in which pasteurization typically takes place, can be used satisfactorily.

The following examples further illustrate the present invention but, of course, should not be construed as in any way limiting its scope.

EXAMPLE 1

This example illustrates the use of the present inventive method in reducing the butterfat content of milk which already has a low butterfat content. This example involves the use of a ECTFE coalescing medium and milk flow rates which are most desirable in connection with the effective utilization of the present invention.

The milk was pumped through a coalescing apparatus similar to that depicted in FIG. 1. The coalescing medium was a 47 mm diameter disc (with 2 mm wide portion of the outer circumference of the disc being held by retaining means and not being exposed to the milk) of a fibrous nonwoven web of ethylene chlorotrifluoroethylene copolymer, which is available as Halar ® ECTFE fluoropolymer nonwoven web (Ausimont USA, Inc., Morristown, N.J.). The fibrous nonwoven web had a sheet weight of about 12 oz/yd$^2$ and an average fiber diameter of about 9 microns. The air flow resistance of the fibrous nonwoven web was about 1.2 in. water column.

The milk was neither pasteurized nor homogenized prior to passage through the coalescing medium. The upstream (initial) and downstream (final) butterfat contents of the milk, milk flow rate, milk temperature, and pressure drop ($\Delta P$) across the coalescing medium varied during the test. These parameters were measured, and the values therefor are set forth in Table 1, wherein "BDL" refers to a butterfat content below the detectable limit, i.e., below 0.005 wt. %.

TABLE 1

| | Butterfat Level (wt. %) | | Milk Flow | Milk Temperature (°C.) | | Pressure Drop |
|---|---|---|---|---|---|---|
| Sample | Upstream | Downstream | (gpm/ft$^2$) | Upstream | Downstream | (psid) |
| 1A | 0.025 | 0.010 | 2.78 | 11 | 12 | 7.5 |
| 1B | 0.025 | BDL | 2.78 | 13 | 12 | 5 |
| 1C | 0.025 | BDL | 3.70 | 13 | 12 | 8 |
| 1D | 0.025 | BDL | 3.70 | 13 | 13 | 15 |

As is apparent from the data set forth in Table 1, the present inventive method is capable of significantly reducing the butterfat content of milk having a butterfat content of 0.025 wt. % at flow rates of 2.78 and 3.70 gpm/ft$^2$. Moreover, this reduction in butterfat content can be accomplished at reasonable pressure drops across the coalescing medium and at the relatively high flow rate of 3.70 gpm/ft$^2$.

EXAMPLE 2

This example illustrates the use of the present inventive method in reducing the butterfat content of milk which has a somewhat higher butterfat content as compared to the milk utilized in Example 1. This example involves the same ECTFE coalescing medium and milk flow rates utilized in Example 1 and which are most desirable in connection with the effective utilization of the present invention.

The milk was pumped through a coalescing apparatus similar to that depicted in FIG. 1 in the same manner and under the same conditions as set forth in Example 1. The milk was neither pasteurized nor homogenized prior to passage through the coalescing medium. The upstream (initial) and downstream (final) butterfat contents of the milk, milk flow rate, milk temperature, and pressure drop (ΔP) across the coalescing medium varied during the test. These parameters were measured, and the values therefor are set forth in Table 2.

TABLE 2

| Sample | Butterfat Level (wt. %) | | Milk Flow (gpm/ft$^2$) | Milk Temperature (°C.) | | Pressure Drop (psid) |
|---|---|---|---|---|---|---|
| | Upstream | Downstream | | Upstream | Downstream | |
| 2A | 0.30 | 0.023 | 2.78 | 18 | 18 | 5 |
| 2B | 0.30 | 0.021 | 3.70 | 16 | 18 | 5 |

As is apparent from the data set forth in Table 2, the present inventive method is capable of significantly reducing the butterfat content of milk having a butterfat content of 0.30 wt. % at flow rates of 2.78 and 3.70 gpm/ft$^2$. Moreover, this reduction in butterfat content can be accomplished at reasonable pressure drops across the coalescing medium.

EXAMPLE 3

This example illustrates the use of the present inventive method in reducing the butterfat content of milk which has even a higher butterfat content as compared to the milk utilized in Example 2. This example involves the same ECTFE coalescing medium and a milk flow rate utilized in Example 1 and which are most desirable in connection with the effective utilization of the present invention as well as a somewhat lower milk flow rate.

The milk was pumped through a coalescing apparatus similar to that depicted in FIG. 1 in the same manner and under the same conditions as set forth in Example 1. The milk was neither pasteurized nor homogenized prior to passage through the coalescing medium. The upstream (initial) and downstream (final) butterfat contents of the milk, milk flow rate, milk temperature, and pressure drop (ΔP) across the coalescing medium varied during the test. These parameters were measured, and the values therefor are set forth in Table 3.

TABLE 3

| Sample | Butterfat Level (wt. %) | | Milk Flow (gpm/ft$^2$) | Milk Temperature (°C.) | | Pressure Drop (psid) |
|---|---|---|---|---|---|---|
| | Upstream | Downstream | | Upstream | Downstream | |
| 3A | 0.70 | 0.46 | 1.85 | 18 | 18 | 5.5 |
| 3B | 0.70 | 0.43 | 2.78 | 15 | 16 | 19 |

As is apparent from the data set forth in Table 3, the present inventive method is capable of reducing the butterfat content of milk having a butterfat content of 0.70 wt. % at flow rates of 1.85 and 2.78 gpm/ft$^2$; however, the reduction is considerably less than that effected for initial lower butterfat contents. The limited reduction in butterfat content can be nevertheless accomplished at reasonable pressure drops across the coalescing medium, and the use of multiple coalescers in series could, of course, be utilized to further reduce the butterfat content.

EXAMPLE 4

This example illustrates the use of the present inventive method in reducing the butterfat content of milk which has a butterfat content similar to that of the milk utilized in Example 1. This example involves the same ECTFE coalescing medium of Example 1, but involves lower milk flow rates than those utilized in Example 1 and which are less than desirable in connection with the effective utilization of the present invention.

The milk was pumped through a coalescing apparatus similar to that depicted in FIG. 1 in the same manner and under the same conditions as set forth in Example 1. The milk was neither pasteurized nor homogenized prior to passage through the coalescing medium. The upstream (initial) and downstream (final) butterfat contents of the milk, milk flow rate, milk temperature, and pressure drop (ΔP) across the coalescing medium varied during the test. These parameters were measured, and the values therefor are set forth in Table 4.

TABLE 4

| Sample | Butterfat Level (wt. %) | | Milk Flow (gpm/ft$^2$) | Milk Temperature (°C.) | | Pressure Drop (psid) |
|---|---|---|---|---|---|---|
| | Upstream | Downstream | | Upstream | Downstream | |
| 4A | 0.03 | 0.020 | 0.93 | 17 | 17 | 1.4 |
| 4B | 0.03 | 0.020 | 0.93 | 18 | 17 | 1.4 |
| 4C | 0.03 | 0.025 | 0.93 | 17 | 17 | 1.2 |
| 4D | 0.03 | 0.010 | 1.85 | 16 | 16 | 1.8 |
| 4E | 0.03 | 0.020 | 1.85 | 17 | 17 | 3.0 |

As is apparent from the data set forth in Table 4, the present inventive method is somewhat capable of reducing the butterfat content of milk having a butterfat content of 0.03 wt. % at a flow rate of 1.85 gpm/ft$^2$ and is only modestly effective in doing so at a flow rate of 0.93 gpm/ft$^2$. This example illustrates the lower limits in flow rates which are useful in conjunction with the present invention.

EXAMPLE 5

This example illustrates the use of the present inventive method in reducing the butterfat content of milk which has been homogenized and pasteurized. This example involves the same ECTFE coalescing medium and milk flow rates utilized in Example 1 and which are most desirable in connection with the effective utilization of the present invention.

The milk was pumped through a coalescing apparatus similar to that depicted in FIG. 1 in the same manner and under the same conditions as set forth in Example 1. The milk was homogenized and pasteurized prior to passage through the coalescing medium. The upstream (initial) and downstream (final) butterfat contents of the milk, milk flow rate, milk temperature, and pressure drop (ΔP) across the coalescing medium varied through the test. These parameters were measured, and the values therefor are set forth in Table 5, wherein "BDL" refers to a butterfat content below the detectable limit, i.e., below 0.005 wt. %.

TABLE 5

| Sample | Butterfat Level (wt. %) | | Milk Flow (gpm/ft$^2$) | Milk Temperature (°C.) | | Pressure Drop (psid) |
|---|---|---|---|---|---|---|
| | Upstream | Downstream | | Upstream | Downstream | |
| 5A | 0.05 | 0.008 | 2.78 | 17 | 18 | 0.5 |
| 5B | 0.05 | BDL | 2.78 | 15 | 19 | 0.5 |

As is apparent from the data set forth in Table 5, the present inventive method is capable of significantly reducing the butterfat content of milk which has been homogenized and pasteurized and which has a butterfat content of 0.05 wt. % at a flow rate of 2.78 gpm/ft$^2$. Moreover, this reduction in butterfat content can be accomplished at reasonable pressure drops across the coalescing medium.

EXAMPLE 6

This example illustrates the use of the present inventive method in reducing the butterfat content of milk using a lower sheet weight version of the same type of ECTFE coalescing medium as used in Example 1. This example involves the same milk flow rates utilized in Example 1 and which are most desirable in connection with the effective utilization of the present invention.

The milk was pumped through a coalescing apparatus similar to that depicted in FIG. 1 in the same manner and under the same conditions as set forth in Example 1, except that the coalescing medium had a sheet weight of 6 oz/yd$^2$.

The milk was neither pasteurized nor homogenized prior to passage through the coalescing medium. The upstream (initial) and downstream (final) butterfat contents of the milk, milk flow rate, milk temperature, and pressure drop (ΔP) across the coalescing medium varied through the test. These parameters were measured, and the values therefor are set forth in Table 6.

TABLE 6

| Sample | Butterfat Level (wt. %) | | Milk Flow (gpm/ft$^2$) | Milk Temperature (°C.) | | Pressure Drop (psid) |
|---|---|---|---|---|---|---|
| | Upstream | Downstream | | Upstream | Downstream | |
| 6A | 0.10 | 0.040 | 2.78 | 16 | 16 | 1 |
| 6B | 0.10 | 0.025 | 2.78 | 16 | 17 | 7 |

As is apparent from the data set forth in Table 6, the present inventive method is capable of achieving a modest reduction in the butterfat content of milk having a butterfat content of 0.10 wt. % at a flow rate of 2.78 gpm/ft$^2$ using a coalescing medium having a sheet weight of 6 oz/yd$^2$. The modest reduction in butterfat content, however, was accomplished at reasonable pressure drops across the coalescing medium.

EXAMPLE 7

This example illustrates the use of the present inventive method in reducing the butterfat content of milk using a coalescing medium prepared from aramid fiber. This example involves the same milk flow rates utilized in Example 1 and which are most desirable in connection with the effective utilization of the present invention.

The milk was pumped through a coalescing apparatus similar to that depicted in FIG. 1 in the same manner and under the same conditions as set forth in Example 1, except that the coalescing medium was three layers of a fibrous nonwoven web of aramid fiber. Each of the fibrous nonwoven web layers had a sheet weight of about 3 oz/yd$^2$ for a total coalescing medium sheet weight of 9 oz/yd$^2$. The average fiber diameter of the coalescing medium was about 10 microns.

The milk was neither pasteurized nor homogenized prior to passage through the coalescing medium. The upstream (initial) and downstream (final) butterfat contents of the milk, milk flow rate, milk temperature, and pressure drop (ΔP) across the coalescing medium varied during the test. These parameters were measured, and the values therefor are set forth in Table 7, wherein "BDL" refers to a butterfat content below the detectable limit, i.e., below 0.005 wt. %.

TABLE 7

| Sample | Butterfat Level (wt. %) | | Milk Flow (gpm/ft$^2$) | Milk Temperature (°C.) | | Pressure Drop (psid) |
|---|---|---|---|---|---|---|
| | Upstream | Downstream | | Upstream | Downstream | |
| 7A | 0.08 | BDL | 2.78 | 17 | 17 | 0 |
| 7B | 0.08 | BDL | 2.78 | 17 | 17 | 0 |
| 7C | 0.08 | BDL | 3.70 | 17 | 17 | 0 |
| 7D | 0.08 | BDL | 3.70 | 17 | 17 | 0 |
| 7E | 0.30 | 0.021 | 2.78 | 16 | 18 | 5 |
| 7F | 0.30 | 0.021 | 2.78 | 17 | 18 | 10 |
| 7G | 0.30 | 0.022 | 3.70 | 17 | 18 | 6 |
| 7H | 0.30 | 0.024 | 3.70 | 17 | 18 | 8.5 |

As is apparent from the data set forth in Table 7, the present inventive method is capable of substantially reducing the butterfat content of milk having butterfat contents of 0.08 and 0.30 wt. % at flow rates of 2.78 and 3.70 gpm/ft$^2$ using an aramid fiber coalescing medium. Moreover, the reduction in butterfat content can be accomplished at reasonable pressure drops across the coalescing medium.

EXAMPLE 8

This example illustrates the use of the present inventive method in reducing the butterfat content of milk using a coalescing medium prepared from polypropylene fiber. This example involves the same milk flow rates utilized in Example 1 and which are most desirable in connection with the effective utilization of the present invention.

The milk was pumped through a coalescing apparatus similar to that depicted in FIG. 1 in the same manner and under the same conditions as set forth in Example 1, except that the coalescing medium was a fibrous nonwoven web of polypropylene fiber. The fibrous nonwoven web had a sheet weight of about 4 oz/yd². The average fiber diameter of the coalescing medium was about 30 microns.

The milk was neither pasteurized nor homogenized prior to passage through the coalescing medium. The upstream (initial) and downstream (final) butterfat contents of the milk, milk flow rate, milk temperature, and pressure drop (ΔP) across the coalescing medium varied during the test. These parameters were measured, and the values therefor are set forth in Table 8.

TABLE 8

| | Butterfat Level (wt. %) | | Milk Flow | Milk Temperature (°C.) | | Pressure Drop |
|---|---|---|---|---|---|---|
| Sample | Upstream | Downstream | (gpm/ft²) | Upstream | Downstream | (psid) |
| 8A | 0.70 | 0.49 | 2.78 | 13 | 16 | 5 |

As is apparent from the data set forth in Table 8, the present inventive method is capable of reducing the butterfat content of milk having a butterfat content of 0.70 wt. % at a flow rate of 2.78 gpm/ft² using a polypropylene fiber coalescing medium. Moreover, the reduction in butterfat content can be accomplished at reasonable pressure drops across the coalescing medium. Further reduction in the butterfat content could, of course, be accomplished by passing the milk through multiple coalescers in series.

EXAMPLE 9

For comparative purposes, this example illustrates the use of a glass fiber medium in connection with the present inventive method in an attempt to reduce the butterfat content of milk. This example involves the same milk flow rates utilized in Example 1 and which are most desirable in connection with the effective utilization of the present invention. The glass fiber medium has a critical wetting surface tension significantly above the critical wetting surface tensions of the coalescing media utilized in Examples 1-8.

The milk was pumped through a coalescing apparatus similar to that depicted in FIG. 1 in the same manner and under the same conditions as set forth in Example 1, except that the coalescing medium was a fibrous nonwoven web of glass fiber. The glass fiber medium had a sheet weight of about 0.7 oz/yd² The average fiber diameter of the coalescing medium was about 16 microns.

The milk was neither pasteurized nor homogenized prior to passage through the coalescing medium. The upstream (initial) and downstream (final) butterfat contents of the milk, milk flow rate, milk temperature, and pressure drop (ΔP) across the coalescing medium varied during the test. These parameters were measured, and the values therefor are set forth in Table 9.

TABLE 9

| | Butterfat Level (wt. %) | | Milk Flow | Milk Temperature (°C.) | | Pressure Drop |
|---|---|---|---|---|---|---|
| Sample | Upstream | Downstream | (gpm/ft²) | Upstream | Downstream | (psid) |
| 9A | 0.08 | 0.08 | 2.78 | 11 | 12 | 0.5 |
| 9B | 0.08 | 0.08 | 2.78 | 12 | 13 | 0.5 |

As is apparent from the data set forth in Table 9, the use of a glass fiber medium, which has a critical wetting surface tension of about 75 dynes/cm, in connection with the present inventive method is incapable of significantly reducing the butterfat content of milk, even when that milk has a relatively low initial butterfat content of 0.08 wt. % and is passed through the glass fiber medium at the desirable flow rate of 2.78 gpm/ft².

All of the references cited herein, including patents, patent applications, and publications, are hereby incorporated in their entireties by reference.

While this invention has been described with an emphasis upon preferred embodiments, it will be obvious to those of ordinary skill in the art that variations of the preferred embodiments may be used and that it is intended that the invention may be practiced otherwise than as specifically described herein. Accordingly, this invention includes all modifications encompassed within the spirit and scope of the invention as defined by the following claims.

What is claimed is:

1. A method of reducing the butterfat content of a liquid milk product comprising:
   (a) providing a coalescing medium having a critical wetting surface tension of no more than about 50 dynes/cm,
   (b) passing a liquid milk product containing butterfat through said coalescing medium at a flow rate of about 1 to about 20 gpm/ft² coalescing medium surface area to form coalesced butterfat particles and reduced-butterfat content liquid milk product, and
   (c) separating said coalesced butterfat particles from said reduced-butterfat content liquid milk product.

2. The method of claim 1, wherein said coalescing medium is a fibrous nonwoven web.

3. The method of claim 2, wherein said fibrous nonwoven web has an average fiber diameter of up to about 50 microns and a sheet weight of about 5 to about 30 oz/yd², 4. The method of claim 3, wherein said fibrous nonwoven web comprises a fluorocarbon polymer.

5. The method of claim 4, wherein said fibrous nonwoven web comprises a copolymer of ethylene and chlorotrifluoroethylene.

6. The method of claim 3, wherein said fibrous nonwoven web comprises polypropylene.

7. The method of claim 3, wherein said fibrous nonwoven web has a sheet weight of about 10 to about 20 ounces/yd$^2$.

8. The method of claim 7, wherein said fibrous nonwoven web has a sheet weight of about 10 to about 15 ounces/yd$^2$.

9. The method of claim 3, wherein said coalescing medium has a critical wetting surface tension of about 40 dynes/cm or less.

10. The method of claim 9, wherein said coalescing medium has a critical wetting surface tension of about 20 to about 40 dynes/cm.

11. The method of claim 3, wherein said flow rate is about 1 to about 10 gpm/ft$^2$.

12. The method of claim 11, wherein said flow rate is about 1 to about 5 gpm/ft$^2$.

13. The method of claim 3, wherein said liquid milk product is selected from the group consisting of milk, whey, and dairy processing cleaning solutions.

14. The method of claim 13, wherein said liquid milk product is milk.

15. The method of claim 14, wherein said liquid milk product has a butterfat content of less than about 4 wt. %.

16. The method of claim 15, wherein said liquid milk product has a butterfat content of less than about 1 wt. %.

17. The method of claim 16, wherein said liquid milk product has a butterfat content of less than about 0.1 wt. %.

18. A method of reducing the butterfat content of milk comprising subjecting said milk to a mechanical cream separator and then treating said milk in accordance with the method of claim 3.

19. A method of reducing the butterfat content of a liquid milk product comprising treating said milk product in accordance with the method of claim 3 more than once.

20. The method of claim 19, wherein said liquid milk product is passed through said coalescing medium more than once.

21. The method of claim 19, wherein said liquid milk product is passed through more than one coalescing medium.

22. A method of reducing the butterfat content of milk comprising subjecting said milk to a mechanical cream separator and then treating said milk in accordance with the method of claim 1.

23. A method of reducing the butterfat content of a liquid milk product comprising treating said milk product in accordance with the method of claim 1 more than once.

24. The method of claim 23, wherein said liquid milk product is passed through said coalescing medium more than once.

25. The method of claim 12, wherein said liquid milk product is passed through more than one coalescing medium.

* * * * *

UNITED STATES PATENT AND TRADEMARK OFFICE
CERTIFICATE OF CORRECTION

PATENT NO. : 5,431,941

DATED : JULY 11, 1995

INVENTOR(S) : JOHN D. MILLER, ALAN R. RAUSCH, KENNETH M. WILLIAMSON AND PETER J. DEGEN

It is certified that error appears in the above-identified patent and that said Letters Patent is hereby corrected as shown below:

Column 9, line 3, delete "through" and substitute therefor -- during --;

Column 9, line 7, "0,005 wt. %" should read -- 0.005 wt. % --; and

Column 9, line 55, delete "through" and substitute therefor -- during --.

Column 14, line 29, delete "claim 12" and substitute therefor

--claim 23--.

Signed and Sealed this

Seventh Day of November, 1995

Attest:

BRUCE LEHMAN

Attesting Officer

Commissioner of Patents and Trademarks